US009201456B2

(12) United States Patent  
Eldershaw et al.

(10) Patent No.: US 9,201,456 B2  
(45) Date of Patent: Dec. 1, 2015

(54) DIGITAL LANYARD FOR SECURING DATA ON PORTABLE DEVICES

(71) Applicant: Palo Alto Research Center Incorporated, Palo Alto, CA (US)

(72) Inventors: Craig Eldershaw, Belmont, CA (US); Peter A. Jarvis, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 103 days.

(21) Appl. No.: 14/016,762

(22) Filed: Sep. 3, 2013

(65) Prior Publication Data

US 2015/0062790 A1 Mar. 5, 2015

(51) Int. Cl.
- *G06F 21/00* (2013.01)
- *G06F 1/16* (2006.01)
- *G06F 21/31* (2013.01)

(52) U.S. Cl.
CPC .............. *G06F 1/163* (2013.01); *G06F 21/00* (2013.01); *G06F 21/31* (2013.01)

(58) Field of Classification Search
CPC .......... G06F 1/163; G06F 21/31; G06F 21/00
See application file for complete search history.

(56) References Cited

U.S. PATENT DOCUMENTS

| 5,796,338 | A | 8/1998 | Mardirossian |
| 6,836,212 | B2 | 12/2004 | Sawinski |
| 7,002,473 | B2 | 2/2006 | Glick et al. |
| 7,131,139 | B1 * | 10/2006 | Meier ............................ 726/4 |
| 7,571,468 | B1 * | 8/2009 | Williams ....................... 726/9 |
| 2003/0151510 | A1 * | 8/2003 | Quintana et al. ........... 340/568.2 |
| 2004/0143730 | A1 | 7/2004 | Wen et al. |
| 2007/0042713 | A1 | 2/2007 | Ben Ayed |
| 2007/0042714 | A1 | 2/2007 | Ben Ayed |
| 2007/0042749 | A1 | 2/2007 | Ben Ayed |
| 2007/0053523 | A1 * | 3/2007 | Iuliis et al. ................ A45F 5/00 381/77 |
| 2009/0207013 | A1 | 8/2009 | Ben Ayed |
| 2009/0207014 | A1 | 8/2009 | Ben Ayed |
| 2011/0215921 | A1 | 9/2011 | Ben Ayed et al. |
| 2011/0293095 | A1 | 12/2011 | Ben Ayed |
| 2012/0238238 | A1 * | 9/2012 | Galuszka ................... 455/404.2 |
| 2013/0148295 | A1 * | 6/2013 | Minn et al. ............... 361/679.59 |

(Continued)

OTHER PUBLICATIONS

Zomm, Wireless Leash, http://www.zomm.com/products/wireless-leash, retrieved from the Internet archive Apr. 23, 2013, 2 pgs.

(Continued)

*Primary Examiner* — Michael Pyzocha  
(74) *Attorney, Agent, or Firm* — Fay Sharpe LLP

(57) ABSTRACT

A data securing system includes a digital lanyard having a first end portion connected with a first line, having a first connector portion, and a second line having a second connector portion. A second end portion of the digital lanyard includes an electronic data generating device interface. The first connector portion of the first line and the second connector portion of the second line, when in operative connection, form a complete electrical connection between the first end portion and the second end portion. The system further includes an electronic data generating device having an electronic data generating device connector portion configured to operatively connect to the electronic data generating device interface of the second end portion, and an authentication portion of the electronic data generating device provides a capability to authenticate a user to permit the user to obtain access to secured and/or restricted data via the electronic data generating device.

23 Claims, 11 Drawing Sheets

(56) References Cited

U.S. PATENT DOCUMENTS

| | | | | |
|---|---|---|---|---|
| 2014/0266729 | A1* | 9/2014 | Perreau et al. | 340/572.9 |
| 2014/0273917 | A1* | 9/2014 | Kalliovaara | 455/404.2 |
| 2014/0369541 | A1* | 12/2014 | Miskin et al. | 381/334 |
| 2015/0028996 | A1* | 1/2015 | Agrafioti et al. | 340/5.82 |
| 2015/0048947 | A1* | 2/2015 | Yang | 340/572.8 |

OTHER PUBLICATIONS

Bluenio, http://www.bluenio.com/products/nio/app, retrieved from the Internet Aug. 21, 2013, 3 pgs.
COBRA Tag, https://www.cobra.com/detail/cobra-tag.cfm, retrieved from the Internet Aug. 22, 2013, 2 pgs.
KICKSTARTER NFC Ring, http//www.kickstarter.com/projects/mclear/nfc-ring, retrieved from the Internet Aug. 22, 2013, 28 pgs.
NYMI Wristband, http://www.getnymi.com/, retrieved from the Internet Aug. 22, 2013, 4 pgs.
BIONYM HeartID, http://www.bionym.com/tech/heartid/, retrieved from the Internet Aug. 22, 2013, 2 pgs.
Fatemian et al., "HeartID: Cardiac Biometric Recognition", Biometrics: Theory Applications and Systems (BTAS), 2010 4th IEEE Intl Conf. on Biometrics Compendium, Sep. 27-29, 2010, 5 pgs.
Wang et al., "Analysis of Human Electrocardiogram for Biometric Recognition", EURASIP Journal on Advances in Signal Processing, vol. 2008, Article No. 19, Hindawi Pub. Corp., NY, NY, Jan. 2008, 17 pgs.
Secure Access Technologies (SAT), http://www.secureaccesstechnologies.com/product.htm, retrieved from the Internet Aug. 22, 2013, 2 pgs.
XyLoc, product brochure, Ensure Technologies, Ypsilanti, MI, 2009, 4 pgs.
Bui, Francis Minthang, et al., "Electrocardiogram (ECG) Biometric for Robust Identification and Secure Communication", Chapter 16 of "Biometrics: Theory, Methods and Applications", John Wiley & Sons, Oct. 29, 2009, pp. 383-427.

\* cited by examiner

US 9,201,456 B2

DIGITAL LANYARD FOR SECURING DATA ON PORTABLE DEVICES

BACKGROUND

The present application is directed to controlling access to restricted and/or secured data which require authentication of a user, prior to providing the user with access. Examples of restricted and/or secured data include but are not limited to medical records protected under the Health Insurance Portability And Accountability Act (HIPAA), military data, corporate data, among many other forms of data.

As electronic data generating devices (e.g., smartphones, tablet computers, laptops, personal data assistants, etc.) have become more portable, users wish to access this restricted and/or secured data in a convenient manner. This creates a potential tension between keeping data secure, and the convenience of accessing the data through such electronic data generating devices.

A particular example of this issue would be nurses using their smartphones to access HIPAA protected healthcare records. The possibility of smartphones being physically lost or stolen exemplifies this tension between data security (i.e., the user is forced to enter a password and/or use a biometric ID on a frequent basis) and usability (user can log in once, and can then casually access confidential data freely for an extended time).

Current solutions include users either entering a pin/password or biometric data on a frequent basis (for example, on every distinct access, or every few minutes) or choosing to risk leaving themselves logged in for an extended period. Other solutions include attempts at also trying to ensure the user and the electronic data generating device are not separated when the user is logged in. These solutions commonly employ some sort of sensor that senses the separation (e.g., the user is out of range of the device), and then provides an indicator of the separation (e.g., an alarm or other alert) and/or acts to end the access to the secured and/or restricted data.

Thus the individual's motivation of convenience is in direct conflict with the organization's goals of limiting potential significant liability or loss or public exposure of such data. With the rise of personally-owned mobile devices (e.g., smartphones) being brought into the work environment, the scope of the problem is growing rapidly.

BRIEF DESCRIPTION

A data securing system includes a digital lanyard having a first end portion connected with a first line, having a first connector portion, and a second line having a second connector portion. A second end portion of the digital lanyard includes an electronic data generating device interface. The first connector portion of the first line and the second connector portion of the second line, when in operative connection, form a complete electrical connection between the first end portion and the second end portion. The system further includes an electronic data generating device having an electronic data generating device connector portion configured to operatively connect to the electronic data generating device interface of the second end portion, and an authentication portion of the electronic data generating device provides a capability to authenticate a user to permit the user to obtain access to secured and/or restricted data via the electronic data generating device.

DETAILED DESCRIPTION

Figure 1:
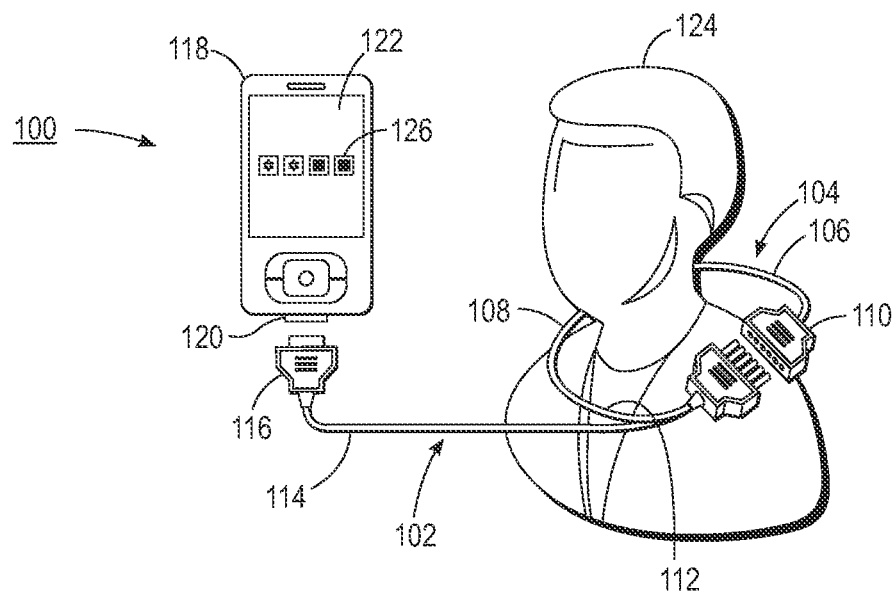
FIG. 1 illustrates a first embodiment of components comprising the data securing system of the present application.

Turning to FIG. 1, illustrated is a first embodiment of a data securing system 100 according to the concepts of the present application. A digital lanyard 102 includes a first end portion 104 having a first line 106 and a second line 108. The first line 106 includes a first connector portion 110, and the second line 108 includes a second connector portion 112. Digital lanyard 102 further includes a second end portion 114 extending from the first end portion 104, and including an electronic data generating device interface 116.

The data securing system 100 further includes an electronic data generating device 118 having at least an electronic data generating device connection portion 120 and an authentication portion 122. As may be seen from the drawings, in one embodiment the electronic data generating device 118 is a smart phone. However, in other embodiments, it is understood this representation in FIG. 1 is intended to represent other devices capable of generating data adaptable for interaction with digital lanyard 102. These include but are not limited to smart phones, desktop computers, tablet computers, laptop computers, personal data assistants, among other devices having at least one electronic digital processor, a memory for storing software code that may be implemented by the device, as well as a user input/output capability, including an electronic keyboard, voice recognition capability, fingerprint recognition, iris identification capabilities and/or other technology that allows for the authentication of a user, such as user 124 shown in FIG. 1.

As also illustrated in FIG. 1, in the authentication portion 122, of this embodiment, a user is inputting a password (i.e., a four-digit password 126). Upon successful entry of the authentication (i.e., acceptance of the password), and as shown in FIG. 2, user 124 is provided with access to secure and/or restricted data 128.

Figure 2:
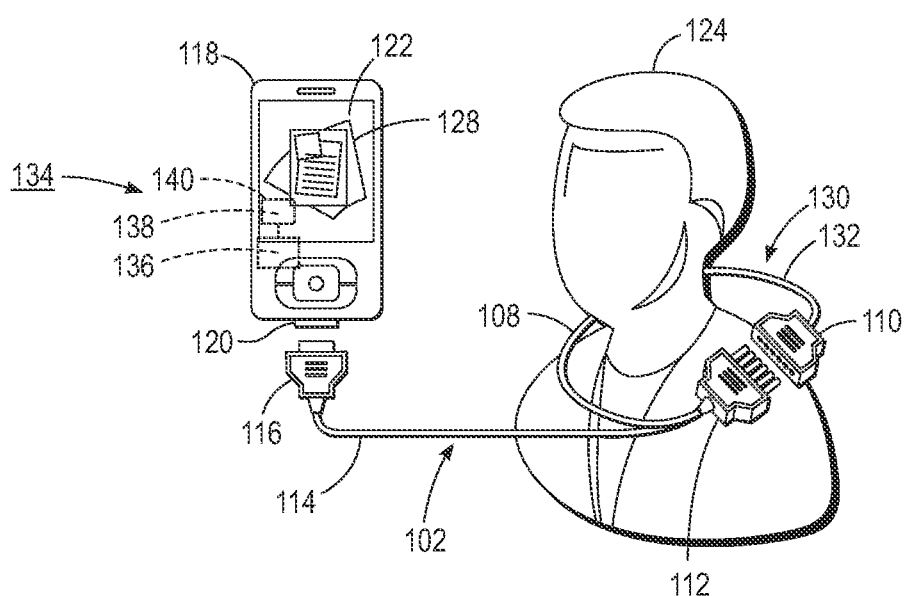
FIG. 2 depicts the components of FIG. 1 further noting the connections and the successful entry of authentication.

It is worth mentioning that in FIGS. 1 and 2 the connection between the mentioned connectors are not shown fully interconnected. This is for ease of showing how the connections are to be made. It is therefore understood the first connector portion 110 and the second connector portion 112 are connected around a body part of the user 124 (i.e., in this example, around the user's neck 130). It is appreciated that in the connected position, the first line 106 and second line 108 forms a loop 132. This loop, in one embodiment, is to be small enough so the user 124 is not able to remove the connected loop 132 without disconnecting the first connector portion 110 and a second connector portion 112.

Once the described connections are made, a sensing arrangement 134 is operational. The sensing arrangement 134 includes, in one embodiment, software code 136 stored in memory storage 138, and operable with at least one electronic processor 140 to provide a substantially continuous sensing and verification of the connection of the digital lanyard 102 to the user 124 and to the electronic data generating device 118. Particularly, the sensing arrangement 134 is configured to sense (i) complete (operative) electrical connection between the first end portion 104 and the second end portion 114, and (ii) the complete (operative) electrical connection between the electronic data generating device interface 116 and the electronic data generating device connection portion 120.

Figure 3:
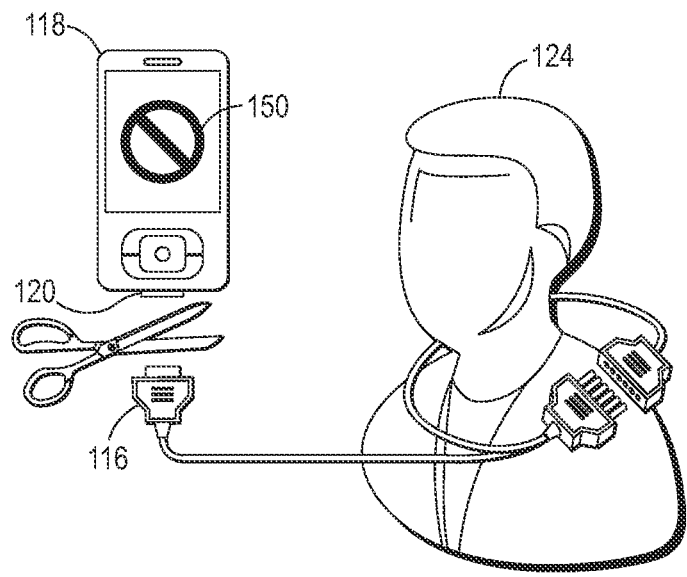
FIG. 3 depicts a break between the digital lanyard and the electronic data generating device at the second end portion.
Figure 4:
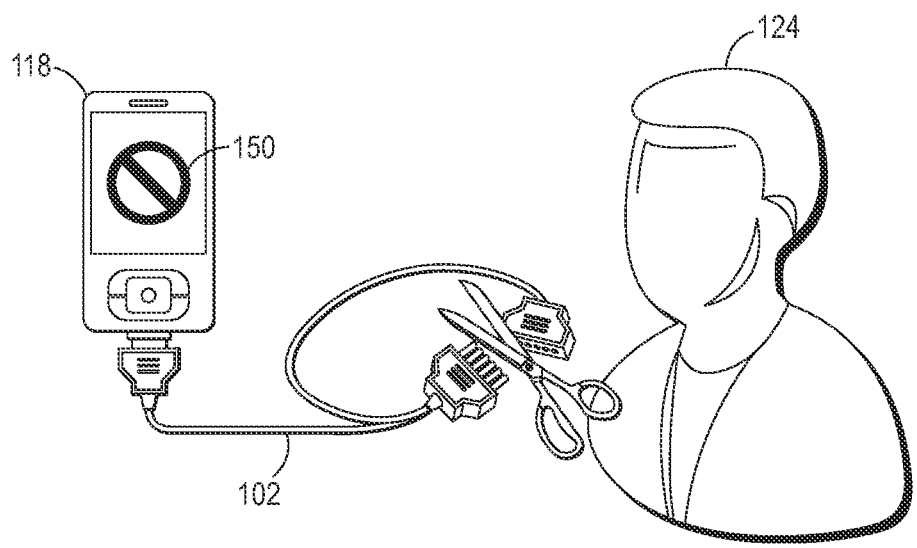
FIG. 4 depicts a break in the connection between the first connection portion and the second connection portion of the digital lanyard.

With attention to FIG. 3, the connection between the electronic data generating device connection portion 120 and the electronic data generating device interface 116 is illustrated as being broken, whereby a visual indication 150 is provided on the screen of the electronic data generating device 118 to indicate that access to the secured and/or restricted data is no longer available to the user. In other embodiments the indication may also or separately include audio alert. A similar depiction is shown in FIG. 4, where the lanyard 102 is no longer in connection with the user 124, which indicates, again, that by symbol 150, access is no longer available to the user of the secured and/or restricted data available through use of the electronic data generating device 118.

Figure 5:
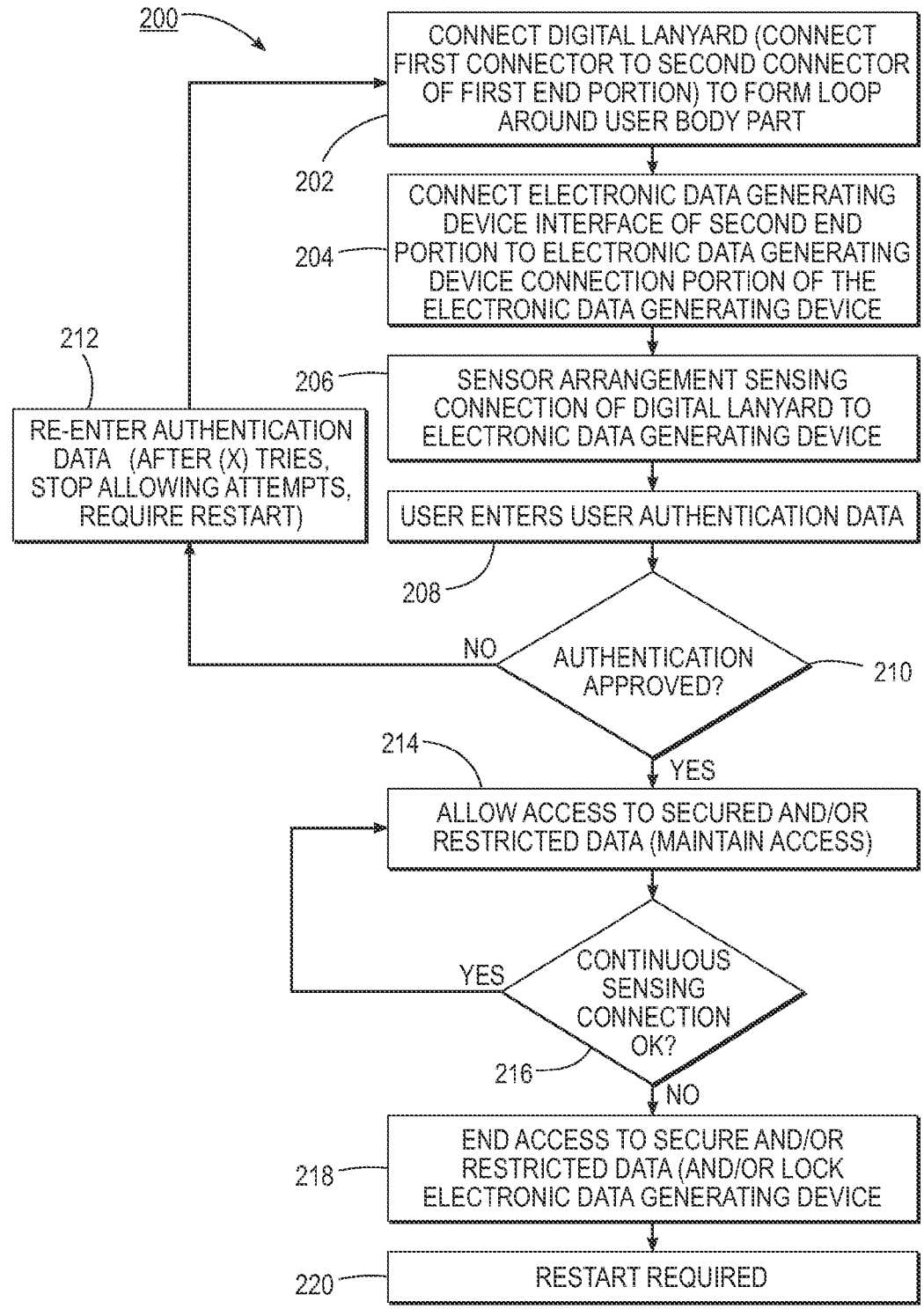
FIG. 5 is a flow diagram representing the steps involved in operation of the system of FIG. 1.

Turning to FIG. 5, depicted is a flow diagram 200, representing steps in the operation of the data securing system 100 according to an embodiment of the present application. More particularly, in a first step 202, the first connection portion and the second connection portion are connected (such as shown in FIGS. 1 and 2) to form the loop around a body part (e.g., the neck) of the user. Then, the electronic data generating device interface of the second end portion of the digital lanyard is connected to the electronic data generating device connection portion of the electronic data generating device 204. It is to be appreciated steps 202 and 204 may be interchanged, as can various other ones of the steps of the flow diagram 200.

At this point, with the connections made above, there is a complete electrical path between the digital lanyard and the electronic data generating device. This allows the sensing arrangement to provide sensing of the connections 206. At this point, the user will enter authentication data 208. This authentication data may be a password, fingerprint, or other biometric data (e.g., iris scanning data, voice recognition data, among other types of authenticating data, etc.).

In step 210, a determination is made whether or not the entered authentication data is valid. If it is not valid (e.g., the user mistyped a password, or the system did not properly interpret the data), the user is permitted to retry the entry of the authentication data 212. This retrying in step 212 may be configured to permit only a limited number of attempts. This is a common security mechanism, where a user may only re-enter their authentication data a limited number of times (e.g., 6 or 7 attempts). Once this limit is reached, the process will deny further attempts, and the process will require a restart (with possibly some time delay and/or the user requiring a reset of the system by a supervisor), by moving to step 202.

When the authentication data is determined to be valid in step 210, the process then permits the user to access and maintain access to secured and/or restricted data 214. During this access time, the process will continue to sense whether the appropriate electrical connections are being maintained 216. If the connections are maintained, the process continues to allow the user access in step 214. However, if in step 216, it is determined that there has been a disconnection of one of the necessary connection points, the process will not allow the user to continue access to the restricted and/or secure data 218 by either simply denying access or locking the electronic data generating device. For example, if the device is owned by the organization the user is employed by, the device may be locked, whereas if the device is the user's personal property, the system may simply deny access so the user may use the electronic data generating device for other action, including those away from work. If access has been denied in step 218, then the system will require in step 220 a restart of the entire process.

It is to be appreciated that various ones of the steps may be altered in the foregoing method steps, for example steps 202 and 204 are interchangeable.

Figure 6:
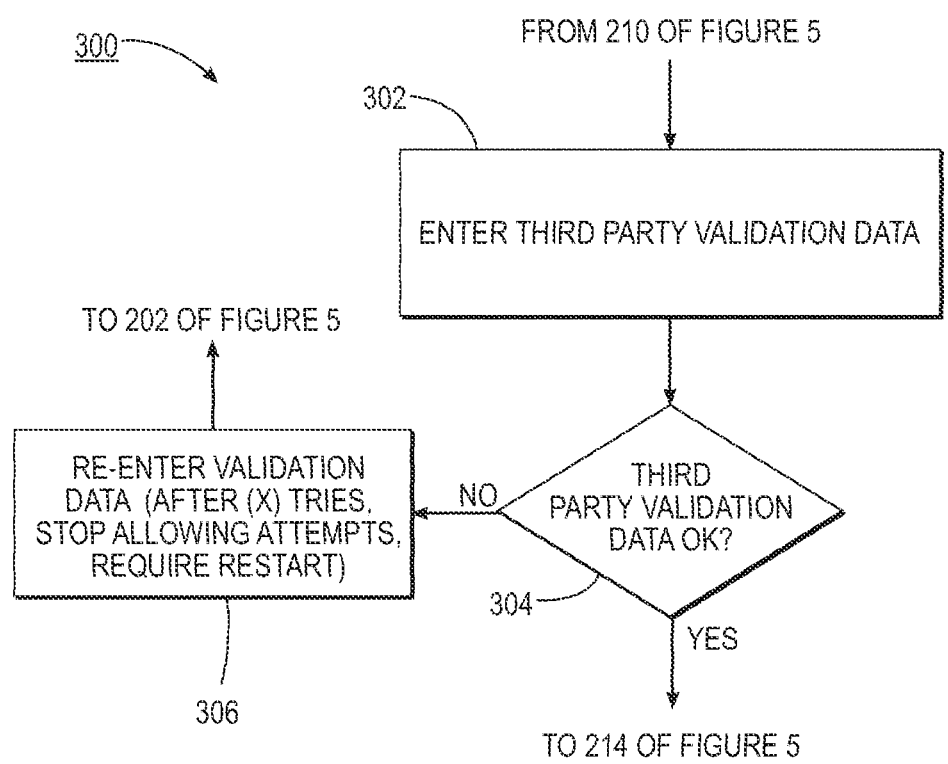
FIG. 6 is a flow diagram portion including an optional operation of the system.

Turning to FIG. 6, an optional operation is illustrated when the process requires a third party to verify the user has properly placed the lanyard around a body part. Particularly there is a possibility the user makes the connections without locating the lanyard around a body part. To avoid this situation an additional third party verification process 300 is implemented. In particular, once the user's authentication has been accepted in 210 of FIG. 5, additional authentication or verification process steps are interposed. In step 302, the third party enters their own special identification or verification data and it is then determined if the verification data is valid (OK) in step 304. This again may be a password, fingerprint or other biometric input. The third party oftentimes will be a supervisor of the user or other person in authority that may take responsibility for proper operation. If the third party entry is not accepted, then in step 306, similar to step 212 of FIG. 5, the third party will be allowed to retry entry a certain number of times prior to being shut out of the system.

When the third party entry in step 302 is determined to be appropriate (in step 304), the process moves to previously discussed step 214 of FIG. 5, and the user is provided with access to the restricted and/or secured data.

As shown in the foregoing, a digital lanyard is mechanically attached to the user, and both electrically and mechanically linked to the electronic data generating device. The user must securely identify themselves to the electronic data generating device, using a password, biometric, or other technique. The software on the electronic data generating device monitors (i.e., senses) the presence of the unopened and connected digital lanyard. If the digital lanyard detects that the connector latch or other mechanism has been opened (allowing it to be detached from the user), then the electronic data generating device revokes the security privileges (i.e., logs out the user from the secure and/or restricted data site). Likewise, privileges are revoked if the lanyard is disconnected from the electronic data generating device.

The sensing can be achieved with a software install to the electronic data generating device and the use of the lanyard.

Therefore, data either on or accessed through the electronic data generating device is protected if the device is lost or stolen. As previously mentioned, in addition to simply disabling the connection to the restricted and/or secure data, the software may be designed to lock the entire device. When the system only restricts access (i.e., it does not lock the device) the electronic data generating device may still be usable (e.g., for non-work activities).

In the foregoing discussion, the digital lanyard does not need to be electronically sophisticated. In embodiments where the electronic data generating device includes the capability of monitoring connectivity (e.g., between two pins on its connectors), then the electronic portion of the digital lanyard may be just two wires which form an open or closed circuit when the connectors are open or closed.

Figure 7:
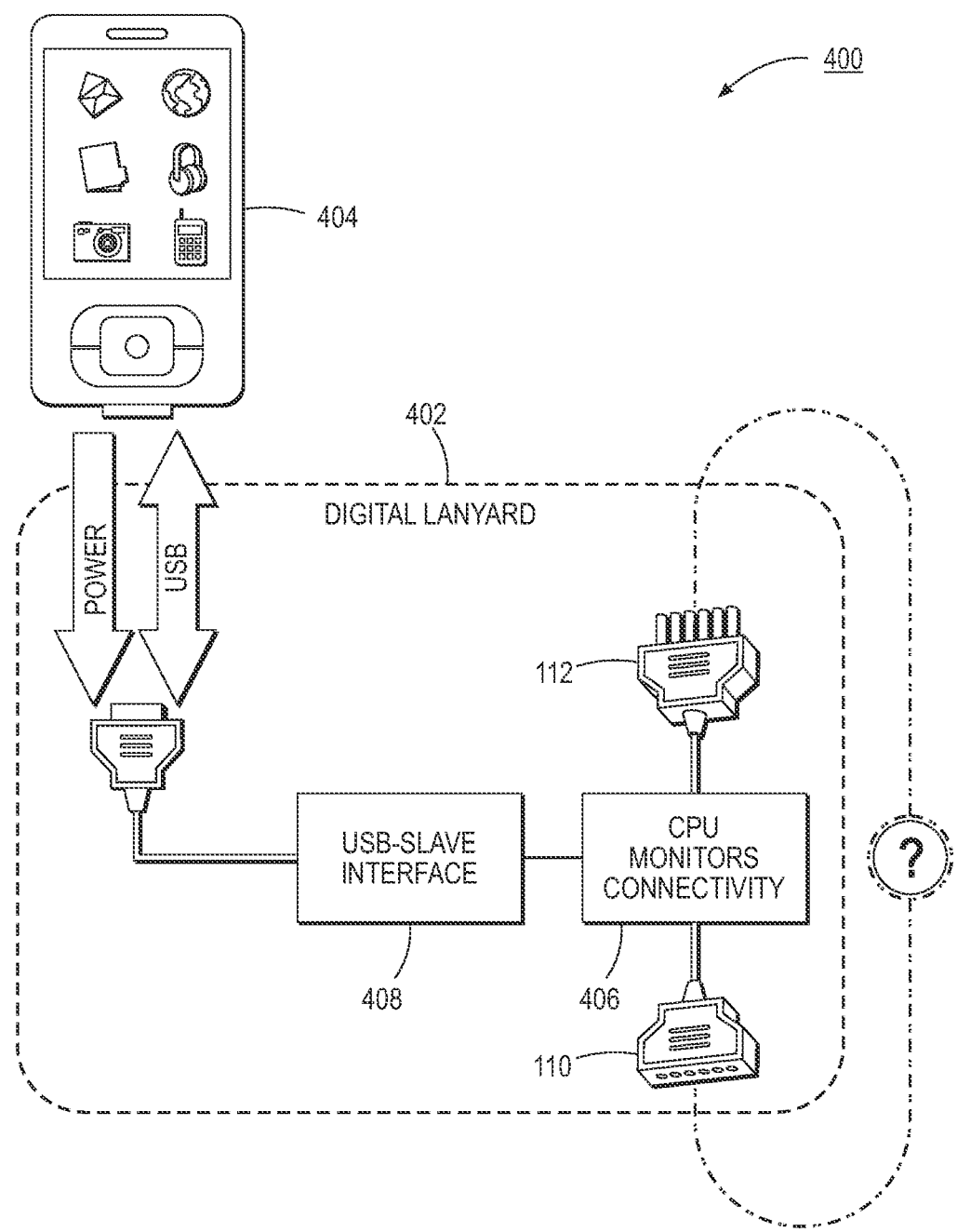
FIG. 7 depicts another embodiment of the data securing system of the present application.
Figure 8:
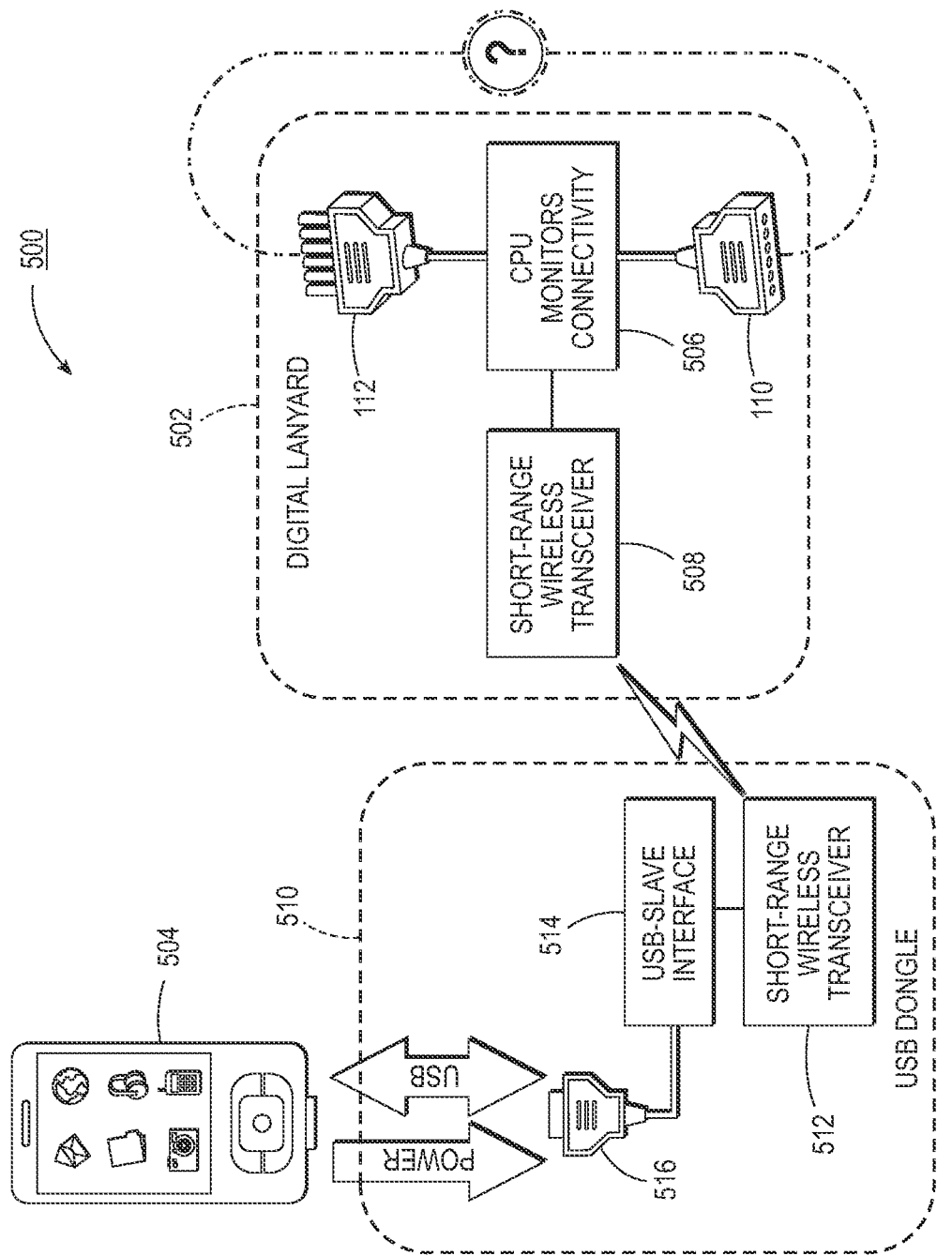
FIG. 8 depicts a further embodiment of the data securing system of the present application.
Figure 9:
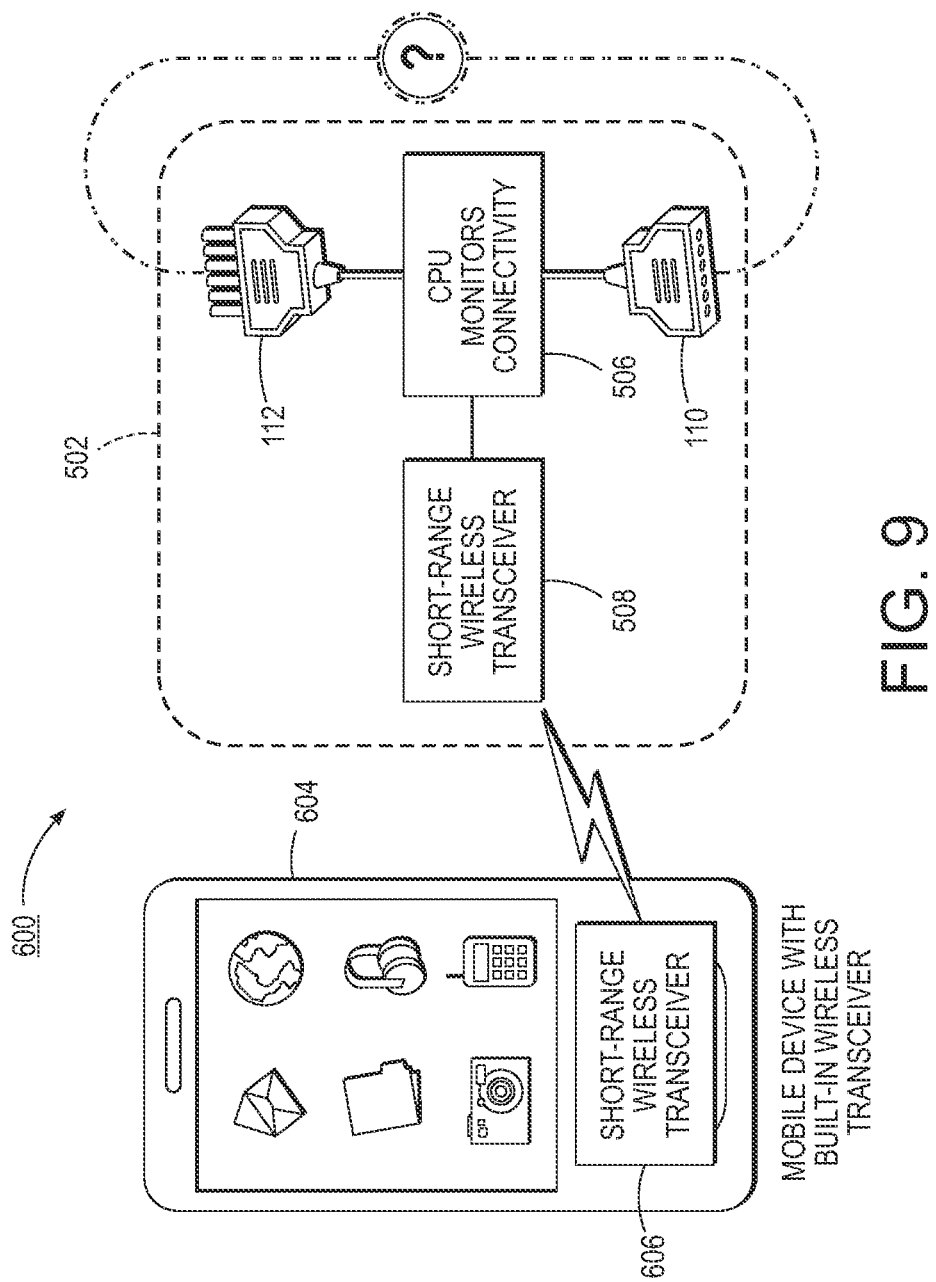
FIG. 9 depicts another embodiment of the data securing system of the present application.

However, in other embodiments, such as shown in FIGS. 7-9, more sophisticated electrical circuitry may be implemented in the digital lanyard. For example, FIG. 7 illustrates an alternative data securing system 400 having a digital lanyard 402 for connection to an electronic data generating device 404. In this embodiment, the digital lanyard 402 includes an electronic processor (e.g., CPU) 406 to monitor connectivity, for example, between first connector portion 110 and second connector portion 112. Similarly, the lanyard 400 also includes a USB-slave interface 408. By this design, the lanyard 402 may act as a USB peripheral to the electronic data generating device 404, and whereby power may be transferred from the electronic data generating device 404 to the lanyard 402. In operation, when the digital lanyard senses a break in connector portions 110, 112 this information is provided to the electronic data generating device 404 to deny further access to the secure and/or restricted data.

In a further embodiment, as shown in FIG. 8, a data securing system 500 includes digital lanyard 502 and electronic data generating device 504. In this implementation, the lanyard 502 in addition to including an electronic processor (e.g., CPU) 506 for monitoring connectivity such as in the system shown in FIG. 7, the digital lanyard 502 includes as part of its second end portion 114 a wireless device 508, such as a short-range wireless transceiver, acting as the interface of the previous embodiments. In this embodiment, the electronic data generating device 504 is configured in order to receive a USB dongle 510, itself having a short-range wireless transceiver 512, where the dongle includes a USB-slave interface 514 and a physical connector 516 for physical connection to the electronic digital data generating device 504. By this arrangement power from the electronic data generating device 504 is able to be supplied to the USB dongle 510.

The connections in FIGS. 7 and 8 also include connections to audio-input pins of the electronic data generating device, also transmitting analog signals may be another method for interfacing.

In FIG. 9, yet another data securing system 600 is shown having the digital lanyard 502 and electronic data generating device 604. In this embodiment, the electronic data generating device 604 includes internal wireless communication capabilities such as the shown short-range wireless transceiver 606. In view of this, the dongle 510 of FIG. 5 is not required, but rather the short-range wireless transceiver 508 of digital lanyard 502 communicates directly with the electronic digital data generating device 604.

By the above embodiments, it can be understood the electrical connection of the electronic data generating device to the digital lanyard may be accomplished in a number of ways. It is noted the native power/data connection for an appropriate electronic data generating device may also be one manner of such connection. A particular aspect of this is that mini-USB and micro-USB connectors are becoming a standard, helping with cross-platform development and deployment of the data securing systems of the present application. A further aspect of various embodiments shown herein is that power is transferable between the electronic data generating devices device and the digital lanyards.

It is to be understood the connections illustrated in the figures are only examples, and different standard connections may be used on many known electronic data generating devices, including an audio-in-channel (e.g., for a microphone).

Figure 10:
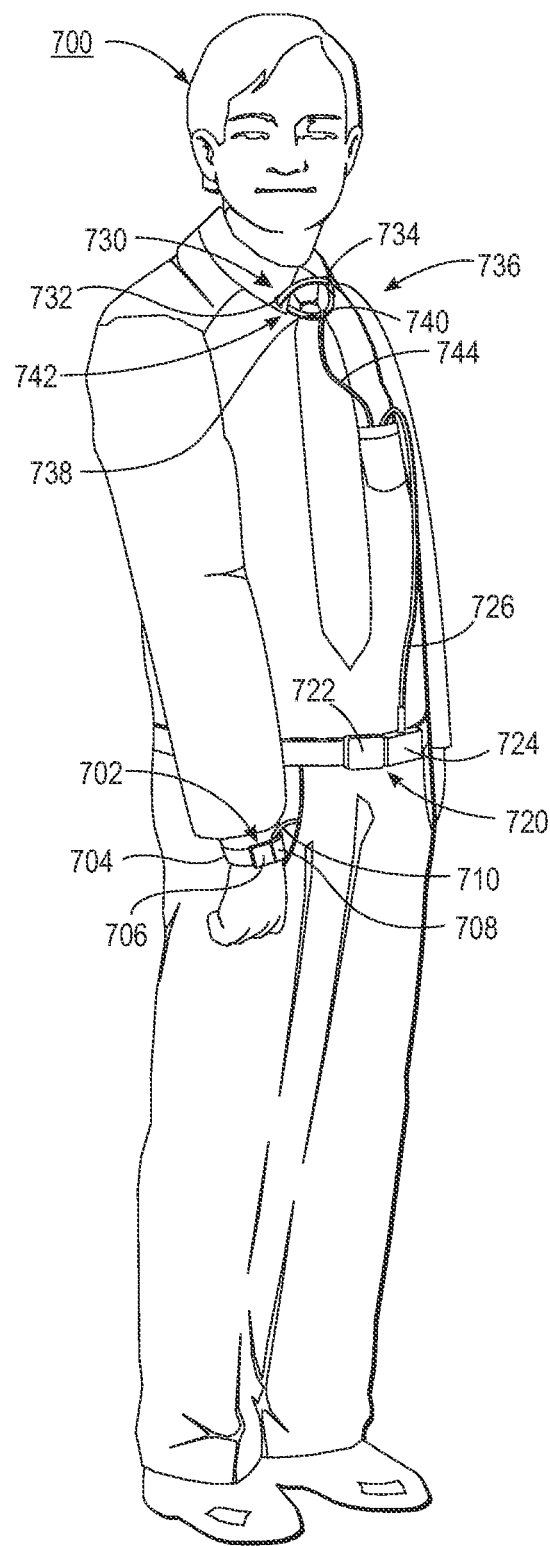
FIG. 10 depicts alternative embodiments for the digital lanyard portion of the present application.

The preceding discussion has focused on the digital lanyard being connected around a user's neck portion. However, it is to be understood, as shown for example in FIG. 10, that lanyards of different sizes may be implemented and located at different locations of a user's body. For example, FIG. 10 shows a user 700 with wrist-band type digital lanyard 702 is employed. In this embodiment loop portion 704 cannot be removed from the wrist without disconnecting connection portions 706 and 708 from each other. A portion of a second end portion 710 is also shown. In another embodiment a digital lanyard 720 is a waist sized lanyard. Again the lanyard 720 is sized and made of a material that requires a disconnection of a first connection portion 722 and a second connection portion 724, from each other. Also shown is a portion of a second end portion 726. The waist sized lanyard may be configured to have the appearance of a belt, where the first and second connection portions 722 and 724 are in designed to also function as a belt buckle. Designing the lanyard to appear as a piece of clothing may increase the acceptance of the use of the lanyard.

In another embodiment, the digital lanyard 730 is designed in an embodiment to be positioned through clothing. This through-clothing digital lanyard 730 is positioned to have the lanyard pass through, for example, holes 732, 734 on a collar 736 of a shirt. The through-clothing digital lanyard 730 of this embodiment uses first connection portion 738 and second connection portion 740 to form a loop 742 that connects the two sections of the collar 736, such that to remove the shirt requires disconnecting the connection portions 738, 740. Also, a portion of the second end portion 744 is shown.

It is noted the foregoing discussion focused on male/female type pin connectors. It is to be appreciated, however, for safety, convenience, reduced cost and/or additional reasons, other connector mechanisms or configurations may be used in the disclosed digital lanyards, and the illustrated connectors are intended to represent such variations. For example, a magnetic clasp mechanism for making the connections to the lanyard loop is employed in another embodiment to provide a secure, easy to operate latching mechanism which will open itself if subjected to excessive tensions. Another embodiment uses a metal snap fastener (such as used in clothing), which provides both electrical connectivity and simple, secure mechanical attachment. A buckle (such as on a belt buckle), wherein the hole has a metal collar, may be used for electrical connection. Other fasteners, such as hook-and-loop, may be used to mechanically hold the two sides of the lanyard together, while magnets guide alignment of two exposed conductive patches.

In another embodiment a digital lanyard includes a mating pair of waterproof free-hanging electrical connectors with built-in strain relief.

To avoid exposed electrical connections, other non-contact techniques/configurations may be employed. Electric or magnetic fields may be generated by one end of a lanyard loop so that detection is achieved by the other side by touching or when the other side is in very close proximity. A magnet and reed switch would be one exemplary implementation.

For convenience as shown in various embodiments, part of the digital lanyard may be developed as being wireless, allowing an air gap between the electronic data generating device and the hardware mechanically connected to the use (i.e., the digital lanyard). For security, a range of the wireless system must be significantly short. Particular embodiments may include near-field communication (NFC), as well as Bluetooth connections. It is also noted that in wireless systems, consumption of battery power is much more significant at this point than a wired system.

Figure 11:
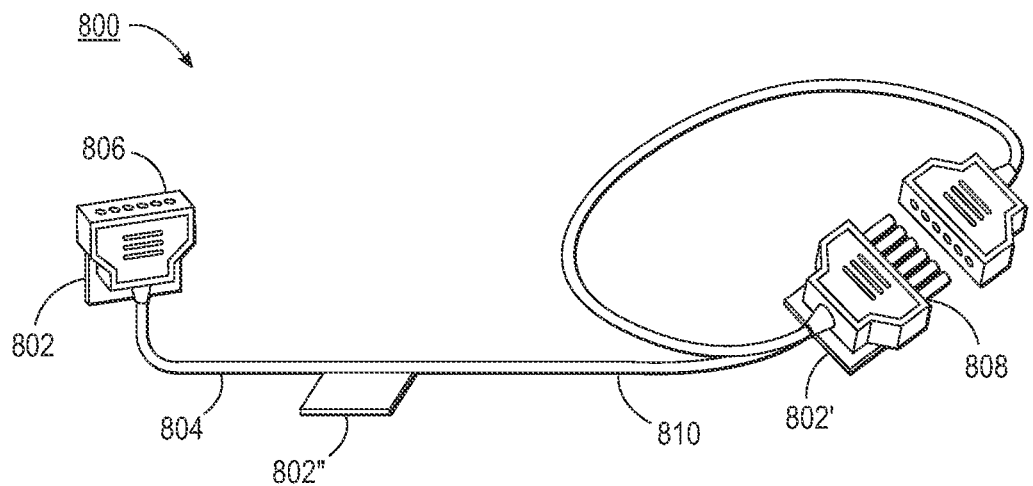
FIG. 11 depicts an alternative embodiment of the digital lanyard, including a batter pack.

Turning to FIG. 11, illustrated is an embodiment of a digital lanyard 800 having an incorporated battery pack 802 (also, 802', 802"). More particularly, FIG. 11 illustrates that the battery pack 802 (802', 802") may be positioned at different locations of the digital lanyard 800. In one embodiment, battery pack 802 is incorporated as part of the second end portion 804 having an electronic data generating device interface 806 located immediately adjacent. It is to be understood in one configuration, the electronic data generating device interface 806 and the battery pack 802 are distinct components, while in another configuration they are integrated into a single package. Alternatively, the battery pack 802' is shown located adjacent one of the connector portions (shown here to be connector portion 808. It is to be appreciated in one configuration the connection portion 808 and the battery pack 802' are distinct components, while in another configuration they are integrated into a single package. In still a further embodiment, the battery pack 802" is shown to be located along the length of the second end portion 810 of the digital lanyard 800.

Figure 12:
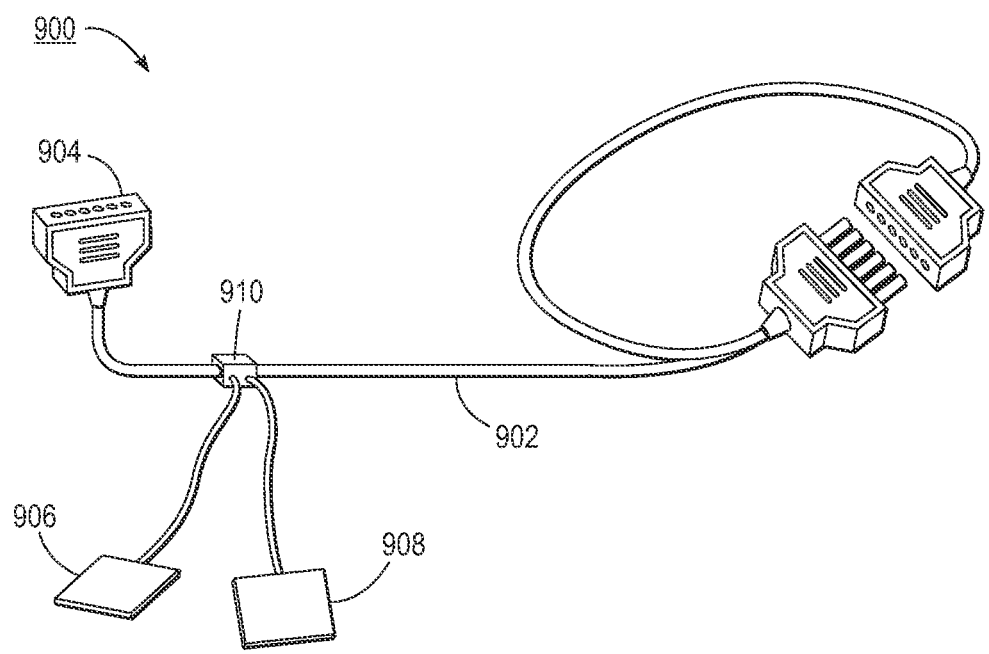
FIG. 12 depicts a further embodiment of the digital lanyard, including an auxiliary or extra connection at the second end portion.

Turning to FIG. 12, illustrated is a digital lanyard 900 embodiment, wherein a second end portion 902 includes an electronic data generating device interface 904, and further at least one auxiliary, extra or additional connector portion 906. A further auxiliary, extra or additional connector portion 908 is also shown to emphasize that more than a single auxiliary, extra or additional connector portion may be included. In one embodiment a splitter 910 is employed to incorporate the auxiliary, extra, or additional connector portion(s). The added connector portion(s) may include but are not limited to USB connectors or connectors that are identical to the electronic data generating device connectors in order to replace the connector consumed by the lanyard. This allows other accessories for the electronic data generating device to be used in connection with the lanyard.

Figure 13:
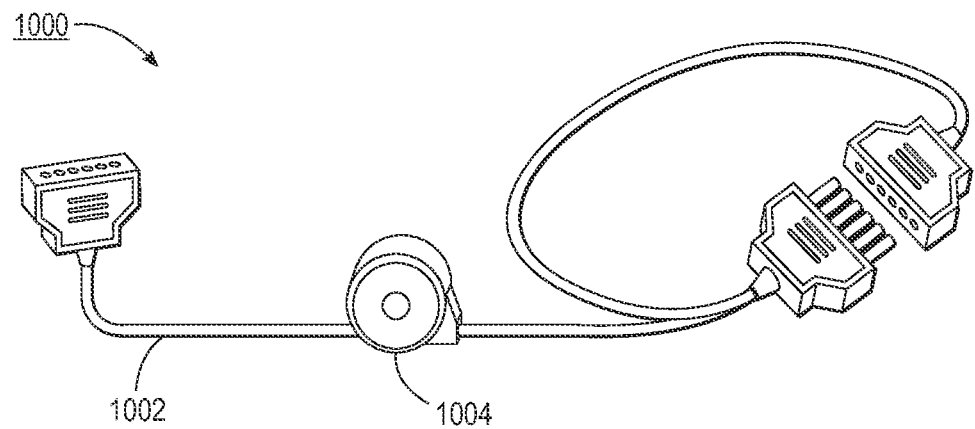
FIG. 13 depicts an embodiment of the digital lanyard, including a self-winding mechanism of the second end portion.

Turning to FIG. 13, depicted is another embodiment of a digital lanyard 1000, wherein a second end portion 1002 is configured to include a self-winding mechanism 1004, which includes a gearing to retract portions of the second end portion. In one embodiment the self-winding and retracting of the second end portion occurs when a user pushes a button on the self-winding mechanism 1004 or when the user makes a short outward pull to engage the winding gears to activate the self-winding, as known in the art. Incorporation of the self-winding mechanism 104 into the second end portion allows a user to extend the second end portion when extra length is needed, and to retract at least a portion of the second end portion when the length is not needed, such as when storing the digital lanyard.

Figure 14:
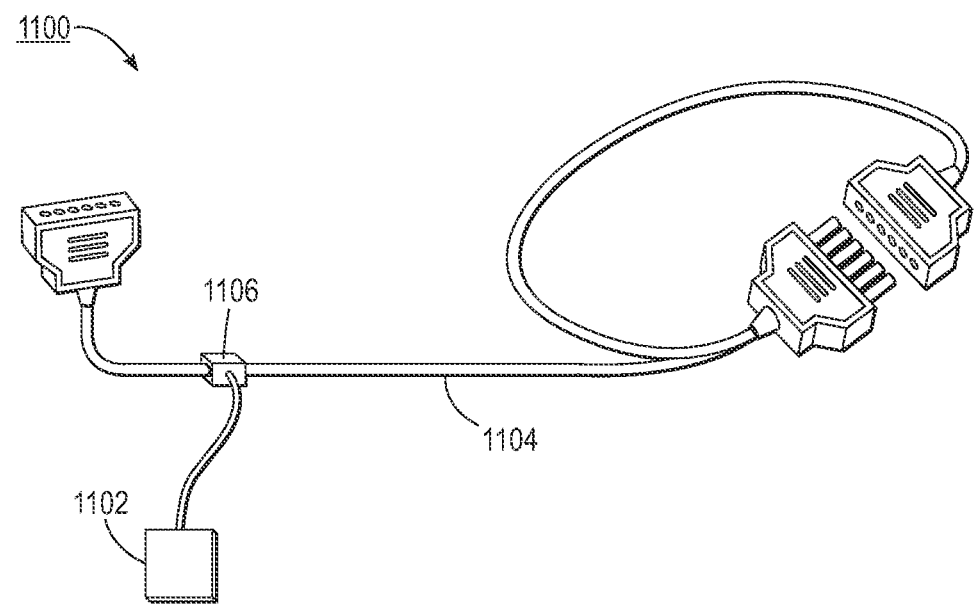
FIG. 14 depicts a further embodiment of the digital lanyard, including a monitoring component for monitoring the human wearer of the digital lanyard.

Turning to FIG. 14, illustrated is a digital lanyard 1100 embodiment including a user monitoring device 1102, connected in the second end portion 1104, of the digital lanyard 1100, through a splitter 1106. In one embodiment, the monitoring device 1102 is an electroencephalography (EEG) monitor capable of monitoring the consciousness of an individual wearing the digital lanyard 1100. The monitoring device 1102 is associated with a user in a manner in line with the functions of the monitoring device, such as in one embodiment, sticky tabs attached to the skin of the user. Once associated with the user, the monitor provides the data obtained to the sensing arrangement which has previously been discussed herein. In this embodiment the sensing arrangement will include software code that senses the output from the monitoring device.

It is to be appreciated other monitoring devices such as a heart monitor may also be used to track a user's vital signs.

For a particular scenario, such as associated in military environment, the biological monitors have particular aspects. For example, when the EEG shows a loss of consciousness or the heart rate monitor shows a cessation of activity of a user employing the digital lanyard 1100, then this data is provided to the sensing arrangement as previously discussed, and the authorization for that user to access secured and/or restricted data is denied and the access is disconnected. This technique and system prevents secure and/or restricted data from the device being accessed by an unknown party (such as an enemy combatant) even though the digital lanyard is still attached to the deceased or unconscious user.

Figure 15:
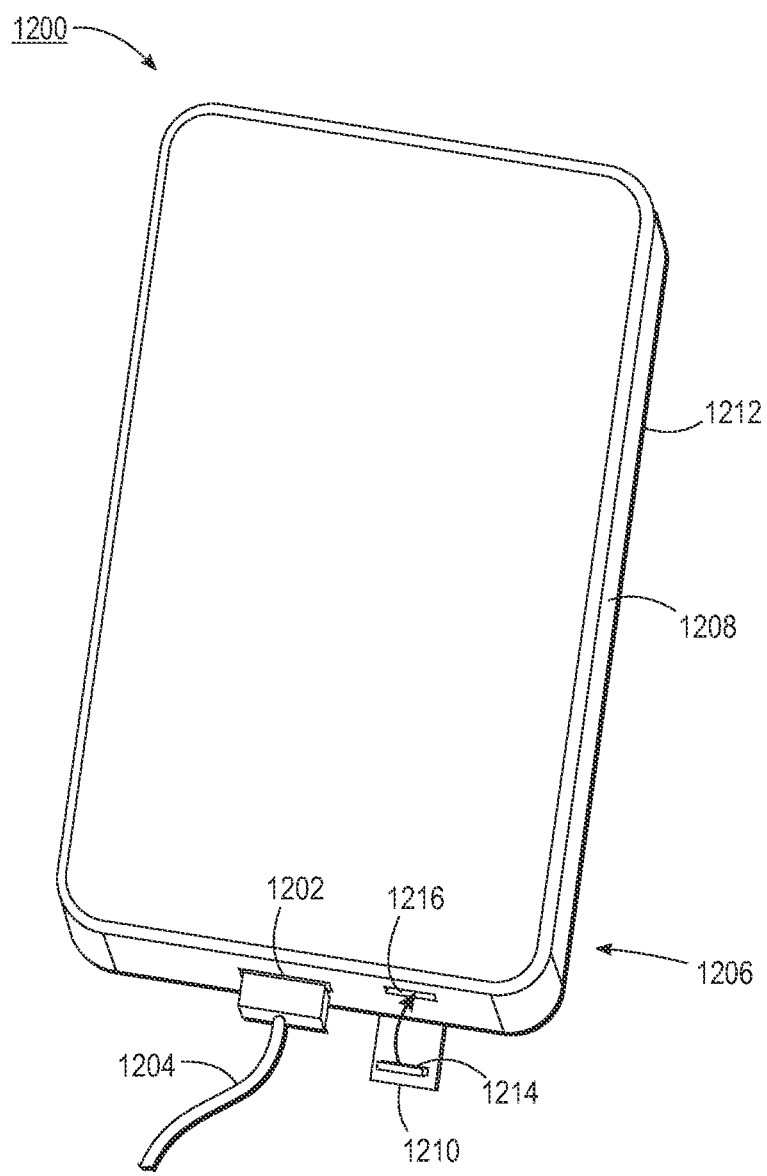
FIG. 15 includes an embodiment of a carrying case for one embodiment of the electronic data generating device.

Turning to FIG. 15, illustrated is a carrying case 1200 provided for carrying an electronic data generating device (not shown). Carrying case 1200 may be an impact or water resisting case, and in certain embodiments designed for easy disinfection. The carrying case 1200 is sized and designed to enclose a corresponding electronic data generating device. Incorporated as part of carrying case 1200, is a connection mating portion 1202 that is configured and positioned to mate to a native connector of an electronic data generating device when carried in the carrying case 1200. In this embodiment, the case incorporated connector 1202 is hardwired to a second end 1204 of a digital lanyard, such as those described herein. Therefore in this embodiment the separate electronic data generating device interface such as interface 116 of FIGS. 1 and 2, is not required.

A carrying case, such as carrying case 1200 may optionally include an integrated power supply 1206 including a battery pack 1208 and power supply connector 1210. Battery pack 1208 is in one embodiment configured as a thin layer located on top of a back side 1212 of the carrying case 1200. The battery pack 1206 includes a number of individually connected batteries or a single packaged battery, and preferably the battery or batteries have a substantially flat profile. The battery pack is in electrical connection with the power supply connector 1210, and the connector 1210 is positioned to mate with an appropriate input of the electronic data generating device (not shown). Note that 1210 and 1202 may be combined when used with some electronic data generating devices. The electrical contact between the connector 1210 and the battery pack is by an internal wiring configuration, such as accomplished by use of wires and/or electrical traces in a manner as would be known to one of ordinary skill in the art.

In the embodiment of FIG. 15, the power supply connector 1210 is in the form of a flexible tab carrying a connection element (e.g., a set of pins, rigid tabs, etc.) 1214 that are positioned to pass through an opening 1216 in the carrying case 1200. This arrangement permits the connection element 1214 to mate to the appropriate input of the electronic data generating device being carried in the carrying case. Once a connection of the described components is made, the electronic data generating device receives power from the battery pack 1208, and in various other described embodiments in turn the electronic data generating device provides power to a connected digital lanyard.

Also, in FIG. 15 the power supply 1206 is shown in the carrying case 1200 with the integrated connector 1202. It is to be appreciated that in certain embodiments the battery pack 1206 may be employed as part of a carrying case without such a connector.

It is also to be understood that while described generally for use in providing authentication for access to digital data, the present securing data system may also be used in environments such as those which require display of ID badges, holding of keys, among others.

Also, it is to be understood that various ones of the embodiments of the lanyard, electronic data generating device and/or case may be incorporated in various combinations. In particular, the examples used are not isolated from each other, but may be used in a system incorporating various ones of those described herein above.

It will be appreciated that variants of the above-disclosed and other features and functions, or alternatives thereof, may be combined into many other different systems or applications. Various and presently unforeseen or unanticipated alternatives, modifications, variations or improvements therein may be subsequently made by those skilled in the art, which are also intended to be encompassed by the following claims.

What is claimed is:

1. A data securing system comprising:
    a digital lanyard including:
        a first end portion configured with a first line having a first connector portion, and a second line having a second connector portion, and
        a second end portion including an electronic data generating device interface,
        wherein with the first connector portion of the first line and the second connector portion of the second line in operative connection a complete electrical connection is made between the first end portion and the second end portion; and
    an electronic data generating device having a restricted access to data including:
        an electronic data generating device connector portion configured to mechanically and electrically connect to the electronic data generating device interlace of the second end portion, and
        an authentication portion configured to authenticate a user to permit the user to obtain access to secured and/or restricted data on or via the electronic data generating device.

2. A data securing system according to claim 1, wherein when the first connector portion in the first line and the second connector portion in the second line are in operative connection, the first line and the second line form a loop around a human body part, wherein the loop is sized so it cannot be removed from the user's body part without disconnection of the first connector portion and the second connector portion from each other.

3. A data securing system according to claim 1, wherein the authentication portion is one of: a password accepting location configured to accept a password to authenticate the user and a biometrics accepting location configured to accept biometrics data to authenticate the user.

4. A data securing system according to claim 1, further including a sensing arrangement including memory storage and at least an electronic processor device, configured to store software code operably configured to sense (i) connection between the first end portion and the second end portion when the first connector portion of the first line and the second connector portion of the second line are in the operative connection and (ii) connection between the electronic data generating device interface and the electronic data generating device connection portion, and the sensing arrangement further configured to sense a break in (i) the complete electrical connection when the operative connection between the first connector portion of the first line and the second connector portion of the second line is broken or (ii) the connection between the electronic data generating interface and the electronic data generating device connection portion is broken.

5. A data securing system according to claim 4 wherein the sensing arrangement includes the memory storage and the at least an electronic processor device, configured to store software code operable to end access to secured and/or restricted data upon sensing of the break in (i) the operative connection between the first connector portion of the first line and the second connector portion of the second line or (ii) the operative connection between the electronic data generating device interface and the electronic data generating device connection portion.

6. A data securing system according to claim 1 further including a third party validation location configured to permit a third party to enter a confirmation code that the first connector portion of the first line and the second connector portion of the second line are in the operative connection around the body part of the user, wherein the third party validation location and the authentication portion are part of a same device.

7. A data securing system according to claim 1 wherein the electronic data generating device interface is an interface plug which makes a mechanical connection between the interface plug and the electronic data generating device.

8. A data securing system according to claim 1 wherein at least a portion of the sensing arrangement is part of the digital lanyard.

9. A data securing system according to claim 1 further including an electroencephalography sensing device configured for connection to a user.

10. A data securing system according to claim 1 wherein the digital lanyard further includes a battery source.

11. A data securing system according to claim 1 further including an auxiliary connector at the second end portion of the digital lanyard wherein the second end portion includes the electronic data generating device interface and the auxiliary connector, the auxiliary connector replacing a connector of the electronic data generating device consumed by the lanyard.

12. A data securing system according to claim 1 wherein the electronic data generating device is at least one of a portable electronic device, a smartphone, a desk top computer, a tablet computer, a laptop computer, and a personal digital assistant.

13. A data securing system according to claim 1, further including a carrying case having connections to the digital lanyard.

14. A data securing system according to claim 1, further including a self-winding mechanism within the second end portion of the digital lanyard.

15. A data securing system according to claim 1, further including a battery source within the digital lanyard.

16. A data securing system according to claim 1, further including a splitter within the second end of the digital lanyard and at least an auxiliary connector extending from the splitter portion, the auxiliary connector replacing a connector of the electronic data generating device consumed by the lanyard.

17. A method of securing data by use of a digital lanyard including (i) a first end portion with a first line having a first connector portion and a second line having a second connector portion, and (ii) a second end portion having an electronic data generating device interface, the method comprising:
- positioning the first line having the connector and the second line having the connector around a body part of a user;
- connecting the connector of the first line to the connector of the second line, wherein the first line and the second line are secured together around the body part, creating a complete electrical path between the first end portion and the second end portion;
- connecting the electronic data generating device interface of the second end and an electronic data generating device, wherein a complete electrical path is formed between the digital lanyard and the electronic data generating device;
- confirming the user identity to the electronic data generating device while the digital lanyard is in a secured position around the body part of the user, thereby maintaining the complete electrical path between the digital lanyard and the electronic data generating device;
- permitting the user with access to secure data from the electronic data generating device;
- sensing the complete electrical path between the electronic data generating device and the digital lanyard while (i) the operative connection between the first line connector and the second line connector is maintained and (ii) the operative connection between the electronic data generating device interface and the electronic data generating device is maintained;
- sensing a break in the complete electrical path between the electronic data generating device and the digital lanyard when (i) the operative connection between the first line connector and the second line connector is disconnected or (ii) the operative connection between the electronic data generating device interface and the electronic data generating device is disconnected;
- blocking access by the user to the secure data, once the break in the complete electrical path has been sensed; and
- restarting the method of securing data by use of the digital lanyard by reconfirming the user identity.

18. A method according to claim 17 wherein the confirming requires the user to enter at least one of a password and biometric data.

19. A method according to claim 17 wherein the confirming requires a third party to enter a confirmation code, and wherein the third party enters the confirmation code on the electronic data generating device, which is connected to the lanyard worn by the user.

20. A method according to claim 17 wherein the connecting of the electronic data generating device interface and the electronic data generating device is a wired connection.

21. A method according to claim 17 wherein the connecting of the electronic data generating device and the electronic data generating device is a wireless connection.

22. The method of claim 17 wherein, prior to the re-confirming the user identity, the restarting further includes:
- re-positioning the first line having the connector and the second line having the connector around a body part of the user;
- re-connecting the connector of the first line to the connector of the second line, wherein the first line and the second line are secured together around the body part, creating a complete electrical path between the first end portion and the second end portion; and
- re-connecting the electronic data generating device interface of the second end and an electronic data generating device, wherein a complete electrical path is formed between the digital lanyard and the electronic data generating device.

23. The method of claim 17 wherein the blocking of access to the user includes locking the electronic data generating device when the device is owned by an organization to which the user is employed, and denying access to the data when the device is owned by the user, allowing the user to employ the electronic data generating device for actions other than accessing the secured data.

\* \* \* \* \*